United States Patent [19]

Bradley et al.

[11] 4,302,882
[45] Dec. 1, 1981

[54] ENGINE BORING FIXTURE

[75] Inventors: Robert W. Bradley; Vyron E. Anderson, both of Cedar Rapids, Iowa

[73] Assignee: Kwik-Way Manufacturing Company, Marion, Iowa

[21] Appl. No.: 37,003

[22] Filed: May 8, 1979

[51] Int. Cl.³ ............................................... G01B 5/14
[52] U.S. Cl. ................................ 33/180 B; 33/174 L; 408/89
[58] Field of Search ....... 33/180 AT, 181 AT, 180 B, 33/182, 174 L, 174 R; 408/89

[56] References Cited

U.S. PATENT DOCUMENTS

2,834,233  5/1958  Anderson .
2,864,268  12/1958  Anderson .
3,053,119  9/1962  Anderson .............................. 408/89
3,273,423  9/1966  Rottler .............................. 408/89 X Primary Examiner—William D. Martin, Jr.
Attorney, Agent, or Firm—Hill, Van Santen, Steadman, Chiara & Simpson

[57] ABSTRACT

An apparatus and method for aligning an internal combustion engine block to be bored by a vertically movable boring tool so that the center of rotation of a crankshaft to be mounted within the engine block is perpendicular to the direction of vertical movement of the tool.

21 Claims, 9 Drawing Figures

ENGINE BORING FIXTURE

BACKGROUND OF THE INVENTION

1. Field of the Invention

The inventive method and apparatus relate to alignment devices and methods for use in boring cylinders of internal combustion engine blocks.

2. The Prior Art

Apparatus for use in boring internal combustion engines are known. However, there continues to be a need for a device and method which will provide even more precise perpendicular alignment between a vertical boring tool and a center of rotation of a crankshaft of the engine. Additionally, there continues to be a need for an apparatus where the block may be fixtured for boring the cylinders without removing dowel pins or studs from the top of the block before beginning the boring operation.

SUMMARY OF THE INVENTION

An engine boring fixture has a four-sided cast iron housing which is covered on the back side by a steel reinforcing plate. The four-sided housing and the reinforcing plate enclose a volume having a substantially rectangular cross-section. An engine support cradle is slidingly mounted on a pair of slides within the enclosed volume. One slide is affixed to each of the two side members. The engine support cradle is a U-shaped structure having an elongated bottom, and a left and a right side wall as well as a rear elongated panel.

Each side wall has two parts, a front part and a rear part, separated by an elongated vertical slot. On each edge of a front part or a rear part of a side wall facing the slot there is cut a keyway. A set of shims of known height may be inserted between the keyway associated with the front portion of a side panel and the keyway associated with a rear portion of the same side panel. Equal numbers of shims are used for the left and for the right side panels or side walls.

A ground, elongated, support bar is supported substantially horizontally by the selected set of shims associated with the left side panel and the right side panel. The purpose of the ground elongated support bar is to provide a primary support bracket for the engine block to be bored. This support bar corresponds to the crank shaft normally found within the engine. The purpose of the engine boring fixture is to insure that the cylinders which are bored by a standard boring tool, affixed to the top member of the housing, are perpendicular to or square with, the elongated ground supporting bar and hence eventually the crankshaft.

A threaded shaft which is supported by a rectangular bracket screwed to the front of the floor of the engine support cradle may be raised or lowered with respect to the cradle floor by rotating it. This threaded shaft provides a secondary support for the engine block being bored.

The top cast iron panel has a top and a bottom ground horizontal surface. The two surfaces are parallel to one another. One is located interior to the housing and one is outside of the housing. Additionally, there is a slot cut in the top member of a selected length and width. It is through this slot that the boring tool extends into the cylinders beneath. In order to minimize wear on the lower ground horizontal surface of the top cast iron member, a pair of precision U-shaped measurement bars are slid onto the top member. Each of the U-shaped measurement bars has a ground lower horizontal surface offset a known distance from the lower horizontal surface of the cast iron top member.

In preparation for receiving an engine block to be bored, the cradle is slid horizontally on the slides forward and out of the cast iron housing. The engine block to be bored is then placed on the elongated supporting bar. The bar passes through the saddles of the crankshaft bearings. The cradle and block are slid horizontally back into the housing. The engine support cradle is raised vertically by a pneumatic air cylinder located beneath it so that a top surface of the bank of cylinders to be bored is brought adjacent the lower ground surfaces of the two U-shaped measurement bars. As the top surface of the cylinder bank approaches the lower ground surface of the two U-shaped measurement bars, the secondary support threaded shaft is cranked either up or down with respect to the floor of the engine support cradle so that the top surface of the bank of cylinders to be bored can be aligned parallel and adjacent to the two lower ground surfaces of the U-shaped measurement bars.

An indicator gauge, of a conventional type, may be placed on the top horizontal surface of the top cast iron member and permitted to extend through the slot in the top cast iron member so as to measure the distance between the top of the elongated supporting bar and the top surface of the cast iron top member at each of the two ends of the engine block. The distances measured at each of the two ends of the engine block are compared. If both distances are the same, the boring tool which moves in a direction perpendicular to the top horizontal cast iron surface will bore a cylinder in the block which is perpendicular to the elongated supporting bar. If the two distances which are measured and compared are different, shims may be placed between the top surface of the bank of cylinders to be bored and the lower ground surfaces of the U-shaped measurement bars to square the engine with respect to the elongated supporting bar.

The engine support cradle is raised and lowered vertically by a pneumatic air cylinder which has one end affixed to the cast iron base of the housing structure and the other end affixed to a lower surface of a horizontal portion of an L-shaped expansion bracket. The top surface of the horizontal portion of the L-shaped expansion bracket is adjacent the underside of the engine support cradle. For reinforcing purposes a pair of elongated reinforcing bars are welded across the length of the underside of the floor of the engine support carriage. A support plate, parallel to the floor of the engine support carriage, is welded to a bottom side of each of the two reinforcing bars. The top surface of the horizontal portion of the L-shaped expansion member is brought in contact with a lower surface of the U-shaped reinforcing bracket welded to the underside of the engine support cradle. Lifting forces are transmitted from the pneumatic cylinder through the horizontal portion of the L-shaped expansion member and through the U-shaped reinforcing bracket welded to the bottom of the floor of the engine support cradle. As the air cylinder is inflated, the top end of it moves in a vertical direction thus moving the engine support cradle and engine block mounted thereon upward toward the upper ground surface of the cast iron top member.

When the top surface of the bank of cylinders to be bored is brought into contact and parallel with the lower ground surfaces of each the U-shaped measurement bars, the engine support cradle is held in position by a pair of mechanical safety devices. Each mechanical safety device has a threaded shaft which passes through a threaded boring in the top cast iron plate. Affixed to a lower end of the shaft, within the volume enclosed by the housing, is a lateral extension. This extension or safety tab can be moved so that it engages a horizontal slot within a safety plate screwed to each of the side members of the engine support cradle. Thus, when the engine support cradle has been moved vertically such that the top surface of the set of cylinders to be bored is adjacent the lower ground surface of the U-shaped measurement bars, the pair of threaded shafts, each having a lateral extensional tab, may be turned such that each tab engages the horizontal safety slot in the associated safety plate. This mechanical engagement locks the engine suppot cradle vertically so that even if air pressure in the main air cylinder should fail, the cradle will be held immovable.

When the engine support cradle is in its lower position, either before an engine has been bored or after an engine has been bored, it may be extended laterally out of the region enclosed by the housing by means of a second, horizontal, 18-inch two-way air cylinder. The second air cylinder has a housing which is attached to the L-shaped vertical extension bracket and a piston which is attached to the floor of the engine support cradle. When the engine support cradle is in its lower position, pneumatic pressure may be applied to the piston of the horizontal air cylinder driving that piston forward out of the region enclosed by the housing hence moving the connected engine support cradle laterally out of the housing also. To retract the engine support cradle within the housing, air pressure is supplied to the other side of the two-way piston.

The engine support cradle, when in its lowered position, is supported by the pair of slides, one slide being affixed to each side member of the engine support fixture. Each slide has a right angle bracket attached to the adjacent cradle side member and a set of support rollers affixed to an interior surface of the adjacent side member of the housing. Each of the support rollers has a horizontal center of rotation and cooperates with the adjacent right angle bracket to provide a low friction bearing which is used when the horizontal two-way air cylinder extends or retracts the support cradle.

When the engine support cradle is extended, the engine block presently being supported thereon may be removed and a new engine block may be placed thereon. To retract the engine support cradle, air pressure is released from the first side of the horizontal piston of the horizontal air cylinder and pressure is applied to the opposite side of the piston retracting that piston back into the region enclosed by the housing. As the piston retracts back into the region, the attached engine support cradle also slides back within the housing on the two sets of support rollers, one set at each end of the cradle.

When the engine support cradle is lifted vertically by the vertically moving air cylinder, it lifts completely off of the two sets of support rollers which are affixed to the two side members of the housing.

To improve the ease with which the engine support cradle may be extended or retracted, a pair of guide rollers, whose purpose is to guide an edge of the adjacent right angle bracket of the engine support cradle, is attached to the interior surface of each side member. Each guide roller rotates about a vertical center of rotation.

Because of the fact that the engine support cradle may be lifted off of the weight supporting rollers, an additional bracket is mounted beneath the right angle bracket on each side of the cradle so that when the engine support cradle is extended laterally out of the region enclosed by the housing, the cradle will not pivot and fall forward off of the weight bearing rollers.

An electrical, pneumatic, control circuit incorporates a pair of limit switches, a pair of solenoid actuated valves and a pair of pneumatic control valves to provide air pressure to inflate the vertical air cylinder when the cradle has been fully retracted or to provide air pressure to the horizontal two-way air cylinder to extend or retract the cradle when it has been moved to its fully lowered position. One limit switch senses the vertical position of the cradle and is operable to actuate one of the two solenoid actuated valves. The second limit switch senses the lateral motion of the engine support cradle and is operable to actuate the second of the two solenoid operated valves. Because of the inner-connections between the limit switches, the solenoid actuated valves and the pneumatic control valves, the engine support cradle may be raised or lowered only when it is fully retracted. The cradle may be retracted or extended only when it is fully lowered. A control panel affixed to one of the cast iron side members provides a convenient mechanism for selecting whether the engine support cradle is to be raised or lowered or to be retracted or extended.

The engine boring fixture may be used with either V-type or in-line engines. To compensate for the various heights between V-type and in-line engines, the two sets of shims are used. One set is associated with each of the two side members of the engine support cradle and permits adjustment of the elongated ground supporting bar. The bar may be raised or lowered in one, two, or three inch intervals depending on the arrangement of shims placed between the front and rear sections of each of the two side members. Additionally, an optional plate may be inserted between the top of the threaded shaft which is affixed to the floor of the engine support cradle and the corner between the floor of the engine support cradle and the vertical rear panel. This additional plate, used in conjunction with two selected sets of shims, permits taller in-line engines to be properly adjusted so that the top surface associated with the bank of cylinders to be bored may be brought into a parallel orientation with the lower ground surface of each of the two U-shaped measuring bars.

The inventive method for fixturing an engine to be bored has the steps of first positioning the engine block to be bored within the engine support fixture. Secondly, the top surface of the bank of cylinders to be bored is brought into parallel alignment and adjacent to a precision surface which is known to be perpendicular to the boring tool. Thirdly, a measurement is made, between the distance from the precision surface perpendicular to the boring tool and the top of the bar supporting the engine through the crackshaft bearing saddles, at each end of the engine. Fourthly, the two sets of measured distances are compared to determine whether or not they are identical.

If the two measured distances are identical or substantially so, then the cylinders to be bored by the vertical boring tool will be square or perpendicular with respect to the elongated engine support bar which supports the engine block at the crankshaft bearing saddles.

DETAILED DESCRIPTION OF THE PREFERRED EMBODIMENTS

Not by way of limitation, but by way of disclosing the best mode and by way of teaching one skilled in the art how to practice my invention there is disclosed in FIGS. 1 through 8 an engine boring fixture 5 incorporating the principles of the apparatus and method of the present invention.

Figure 1:
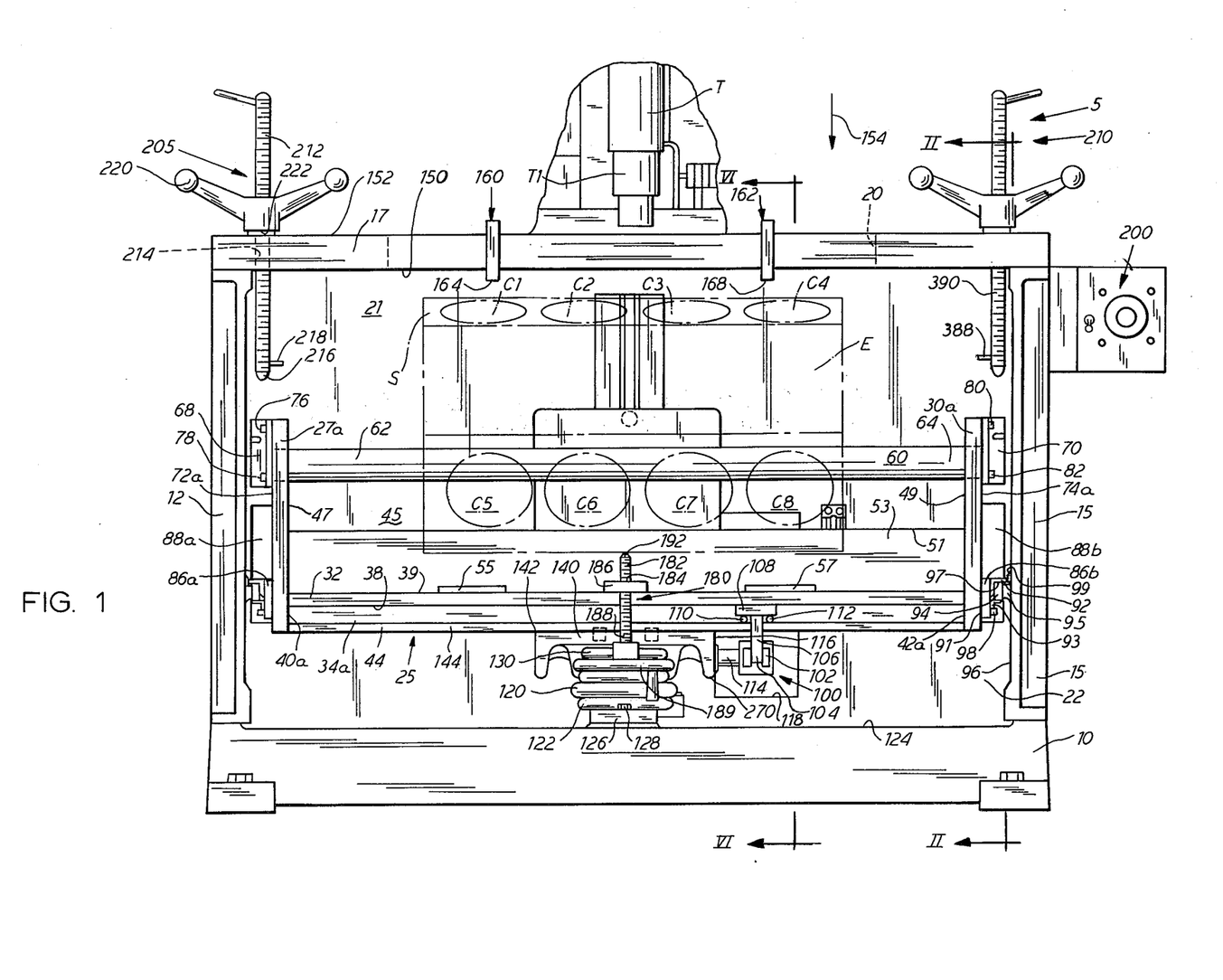
FIG. 1 is a frontal elevation of the engine block support fixture of the present invention.

With respect to FIG. 1, the engine fixture 5 comprises a housing with an elongated cast iron base 10, a pair of parallel cast iron sides 12, 15 each perpendicular of the cast iron base 10 and a cast iron top 17 parallel to the base 10. The top 17 is affixed to the two sides 12 and 15 in any conventional fashion and has an elongated slot 20 therein. A steel plate 21 is rigidly attached to the base 10, the sides 12,15 and the top 17 to strengthen the housing. The base 10, the sides 12, 15 and the top 17, enclose a region 22 wherein there is movably mounted an engine support cradle 25.

The engine support cradle 25 is a U-shaped structure having a first side member 27 parallel to a second side member 30. Each side member 27, 30 has a front section 27a, 30a and a rear section 27b, 30b. The two side members 27 and 30 are joined by a rigid, rectangular floor member 32. The side members 27 and 30 can be welded to the floor member 32. A pair of elongated supporting bars 34a, 34b, are welded to a surface 38 of the floor 32 to improve the rigidity and strength of the floor 32. The elongated stiffening bar 34a is also to be welded to an interior surface 40a, 42a of the two respective side wall front sections 27a and 30a. An elongated lifting plate 44 is welded to the bar 34a and to the rigid bar 34b, not seen in FIG. 1, to form a U-shaped lifting bracket. The engine support cradle 25 also has an elongated rear panel 45 which is affixed at a pair of seams 47, 49 to the rear sections 27b, 30b, of the two side walls 27 and 30. Additionally, along a seam 51, the elongated rear panel 45 is attached to a top surface 53 of the floor member 32. A pair of elongated engine support pads 55, 57 are also attached to the surface 53 of the floor panel 32.

An elongated engine support bar 60 is supported at a first end 62 and at a second end 64 by the side wall members 27 and 30, respectively. A pair of safety locking plates 68, 70 is attached to a pair of exterior surfaces 72, 74 of the side members 24, 30, respectively, of the engine support cradle 25. A pair of bolts 76, 78 affixes the safety plate 68 to the external surface 72a of the side member 27a. A similar pair of bolts 80, 82 affixes the safety plate 70 to the external surface 74a of the side member 30a. The engine supporting bar 60 supports an engine block E which is to be bored. The bar 60, which is a ground and polished shaft is located in the crankshaft bearing saddles which are an integral part of the engine block E.

The engine support cradle 25 may be slid laterally in and out of the region 22 on a pair of slides 86a, b affixed respectively to the exterior surfaces 72, 74 of the side members 27, 30 of the U-shaped engine support cradle 25. A pair of slots 88a, b in the rear steel plate 21 permit the pair of slides 86a, b to extend beyond the rear of the boring fixture 5.

The elongated slide members 86a, b are attached to the two external surfaces 72, 74 of the side members 27, 30 of the engine support cradle 25. The members 86a, b provide a mechanism whereby the engine support cradle 25 may be moved laterally with respect to the base 10 outwardly from the enclosed region 22 so that the engine block E may be loaded onto the support bar 60. The slides 86a, b are identical and a discussion of slide 86b will also apply to slide 86a. Slide 86b has a first elongated surface 91 which is located adjacent the exterior surface 74 of the side member 30. Slide 86b also supports a pair of angle members 92, 93. The member 92 is affixed to the slide 86b above the right angle member 93. A roller 94 having a support member 95 is rigidly affixed to an interior surface 96 of the cast iron side 15. The roller 94 is pivotably mounted to the support member 95 and may freely rotate about a horizontal axis of rotation. When the engine support cradle 25 is moved laterally out of the region 22 it is supported by a lower, horizontal surface 97 of the right angle member 92 which is in contact with the roller 94. As the surface 97 moves across the roller 94, the roller 94 rotates on the support member 95 thereby providing a low friction mechanism for the extension and retraction of the cradle 25. A cap screw 98 which goes through a hole in the slide 86b, passes into a tapped hole in the front side portion 30a of the cradle 25 and holds the slide 90 against the surface 74a. A guide roller 99, which does not support the weight of the cradle 25 as does the roller 94, is located adjacent one edge of the right angle member 92 and is affixed to the interior surface 96 of the side 15. The purpose of the guide roller 99 is to cooperate with the right angle member 92 as the cradle 25 is being extended and retracted thereby insuring that travel of the cradle 25 is as friction free and smooth as possible.

To assist in moving the cradle 25 laterally with respect to the base 10, a two-way air cylinder 100 is mounted horizontally within the fixture 5. A front linking member 102 is pivotally attached to a stem 104 of a T-shaped linkage member 106. An upper section 108 of the T-shaped member 106 is perpendicular to the stem 104 and is affixed to the lower surface 38 of the floor member 32 of the cradle 25 by a pair of screws 110, 112. The piston 100 is also attached by a bracket 114 to a surface 116. The cylinder 100 can extend past the steel plate 21 through a port 118 in the plate 21.

The linking member 102 of the air cylinder 110 can be extended or retracted laterally with respect to the surface 116, and also the base 10, thereby sliding the engine cradle 25 in or out of the region 22 on the slides 86a, b. The purpose for being able to move the engine cradle 25 laterally with respect to the base 10 is so that the engine block E may be conveniently located on the ground round bar 60 when the cradle 25 is extended. After the engine E has been properly located the two-way cylinder 100 can be caused to retract the cradle 25 on the slides 86a, b thereby moving the engine E into the region 22 to clamp it for boring.

The engine cradle 25 may be raised and lowered with respect to the floor plate 10 by an air cylinder 120 such as a Firestone Double Convolution Air Actuator or air stroke cylinder. The air cylinder 120 has a first mounting end 122 which is attached to an interior surface 124 of the cast iron plate 10 by a clamp plate 126 which is fastened to the surface 124 by a bolt 128. The air cylinder 120 at a second end 130 is attached to a horizontal member 140. The member 140 has a top surface 142 which comes into contact with a lower surface 144 of the elongated reinforcing plate 44 affixed to the undersurface 38 of the floor 32 by the bars 34a, b. When the air cylinder 120 is caused to be inflated by an air supply, not shown in FIG. 1, the end 130 is forced upwardly away from the surface 124 of the base 10. The cylinder 120 in turn lifts the horizontal member 140 attached to the end 130. The engine support cradle 25 moves vertically off of the set of support rollers on which the slides 86a, b move laterally with respect to the base 10. A top surface S of the engine block E is moved toward a ground and hardened surface 150 of the upper cast iron member 17.

When the air pressure is released from the cylinder 120 the weight of the engine block E causes the engine cradle 25 to move downwardly toward the surface 124 of the base 10.

The surface 116 is on the horizontal member 140 which lifts the cradle 25. Since the horizontal air cylinder 100 is attached to both the cradle 25 and the lifting member 140 it moves up and down with the cradle 25.

The upper cast iron plate 17 has two parallel ground surfaces, the surface 150 and a second parallel surface 152. The upper surface 152 supports a standard cylinder boring tool T. The tool T forms no part of the present invention. The tool T has a spindle T1 which can move in a direction 154 perpendicular to the surface 150 or the surface 152. The lower surface 150 of the cast iron top member 17 can align the top surface S of the engine block E perpendicular to the direction 154 when the engine support cradle 25 is elevated by inflating the air cylinder 120. When the cylinder 120 is inflated, the surface S can be brought into contact with the ground cast iron surface 150. In this condition, with the surface S adjacent the ground cast iron surface 150, the engine block E is held in position between the surface 150 and the ground elongated bar 60. The cylinders C1 through C4 of the engine block E may be bored by a tool clamped in the tool holder T1 of the boring tool T.

To minimize wear on the ground surface 150 by the surface S, a pair of U-shaped measurement members 160, 162 having a pair of lower ground surfaces 164, 168 may be slidingly placed over the top cast iron member 17. In this embodiment, the surfaces 164, 168 are parallel to the surface 150, and are offset a known amount therefrom. The surfaces 164, 168, rather than the surface 150, are brought in contact with the surface S to align the cylinder C1 through C4 for boring purposes. An additional advantage resulting from using the members 160, 162 is that the members 160, 162 may be moved so as to avoid any studs extending from the surface S.

When the surface S is brought adjacent the ground surfaces 164, 168 of the two U-shaped members 160, 162, since the bar 60 extends through the saddles of the crankshaft bearings on the engine block E, the center line distance between the crankshaft bearings of the engine block E and the top surface S of the block E may be checked to make sure the cylinders such as C1 through C4 are bored square with respect to the crankshaft which would replace the ground bar 60. In view of the elongated nature of the engine block E, it is desirable to locate the two U-shaped members 160, 162 adjacent opposite ends of the engine block E. For boring purposes, a boring tool held by the tool holder T1 extends through the slot 20 in the cast iron top member 17 to the cylinders C1 through C4.

It should be noted that the exemplary engine block E of FIG. 1 is an eight-cylinder V-type engine. The fixture 5 may be used with all types of block configurations. Because the two sets of cylinders in the V-type engine of FIG. 1 are offset and 90° with respect to one another, a second set of cylinders C5 through C8 along with the associated portion of the engine block E must be supported when the block E is fixtured between the ground rod 60 and the ground surfaces 164, 168. To assist in supporting cylinders C5 through C8, a secondary support mechanism 180 is used. The support mechanism 180 has a threaded shaft 182 and which extends through a threaded hole 184 in a bracket 186. Attached to an end 188 of the shaft 182 is a hand wheel 189 of a conventional variety. A second end 192 of the shaft 182 may be brought to bear against a surface G of the engine block E by an operator rotating the handle 189. Rotating the handle 189 advances the shaft 182 through the threaded bracket 186. The surface G of the block E may be forced upward with respect to the floor 32 thereby supporting cylinders C5 through C8.

Thus, engine block E receives support through the crankshaft bearing saddles by the ground bar 60, and at the surface G by the shaft 182 of the support assembly 180. The upper surface S is aligned by the ground surfaces 164, 168.

A control panel 200 is operable to control the extension or retraction of the horizontal air cylinder 100 which in turn controls the extensional retraction of the engine support cradle 25 with respect to the base 10. The engine support cradle 25 may be extended or retracted only when it is in its lowered position and the surface S is not in contact with the surfaces 164, 168. Another setting of the control panel 200 permits the support cradle 25 to be raised thereby bringing the surface S of the engine block E into contact with the surfaces 164, 168 so that cylinders C1 through C4 may be bored by the tool T. It should be noted that when the surface S is being brought into contact with the surfaces 164, 168 the tool T may be used to bore one cylinder, such as the cylinder C1, or successively, a plurality of cylinders, such as C1 through C4. Additionally, it should be noted that the engine fixturing assembly 5 is suitable for use with V-8 engines such as the V-8 engine block E or it may be utilized with in-line engine blocks or any other configuration.

The essence of operation of the fixturing assembly 5 lies in the fact that the ground bar 60 aligns the engine block E through the saddles of the crankshaft bearings of the engine block E. The fixture 5 thereby provides a means whereby the distance between the center line of the crankshaft may be measured with respect to each end of the engine block E by means of the surfaces 164, 168 which are perpendicular to the boring direction 154 of the tool T. If the distances so measured are at identical or substantially so, the cylinders C1 through C4 will be bored square or perpendicular to the crankshaft by the tool T.

When the surface S has been brought into contact with the surfaces 164, 168 a pair of safety support mechanisms 205, 210 may be used to mechanically support the engine cradle 25 during the boring process. The assemblies 205, 210 are identical. A description of the assembly 205 will suffice for both. A threaded shaft 212 extends through a threaded hole 214 in the top cast iron member 17. A lower end 216 of the shaft 212 has a lateral extension 218 affixed thereto. The end 216 of the shaft 212 may be moved vertically with respect to the engine support cradle 25 by rotating the shaft 212 in the threaded boring 214. When the engine support cradle 25 has been raised so that the surface S is adjacent the surfaces 164, 168 the lateral extension 218 may be rotated by rotating the shaft 212, so as to engage the safety plate 68 associated therewith. The engagement between the lateral extension 218 and the safety plate 68 will support the side 27 of the engine support cradle 25 mechanically. A locking safety nut 220, which can rotate on the threaded shaft 212, has a surface 222 which may be driven adjacent the surface 152 of the top cast iron member 17. The safety nut 220 functions as a locking mechanism to insure that the shaft 212 will not rotate once the lateral extension 218 has engaged the safety plate 68. With the assembly 205, 210 engaging the safety plates 68, 70 the engine support cradle 25 will be supported vertically, mechanically, independently of the air cylinder 120.

Figures 2, 3, 4:
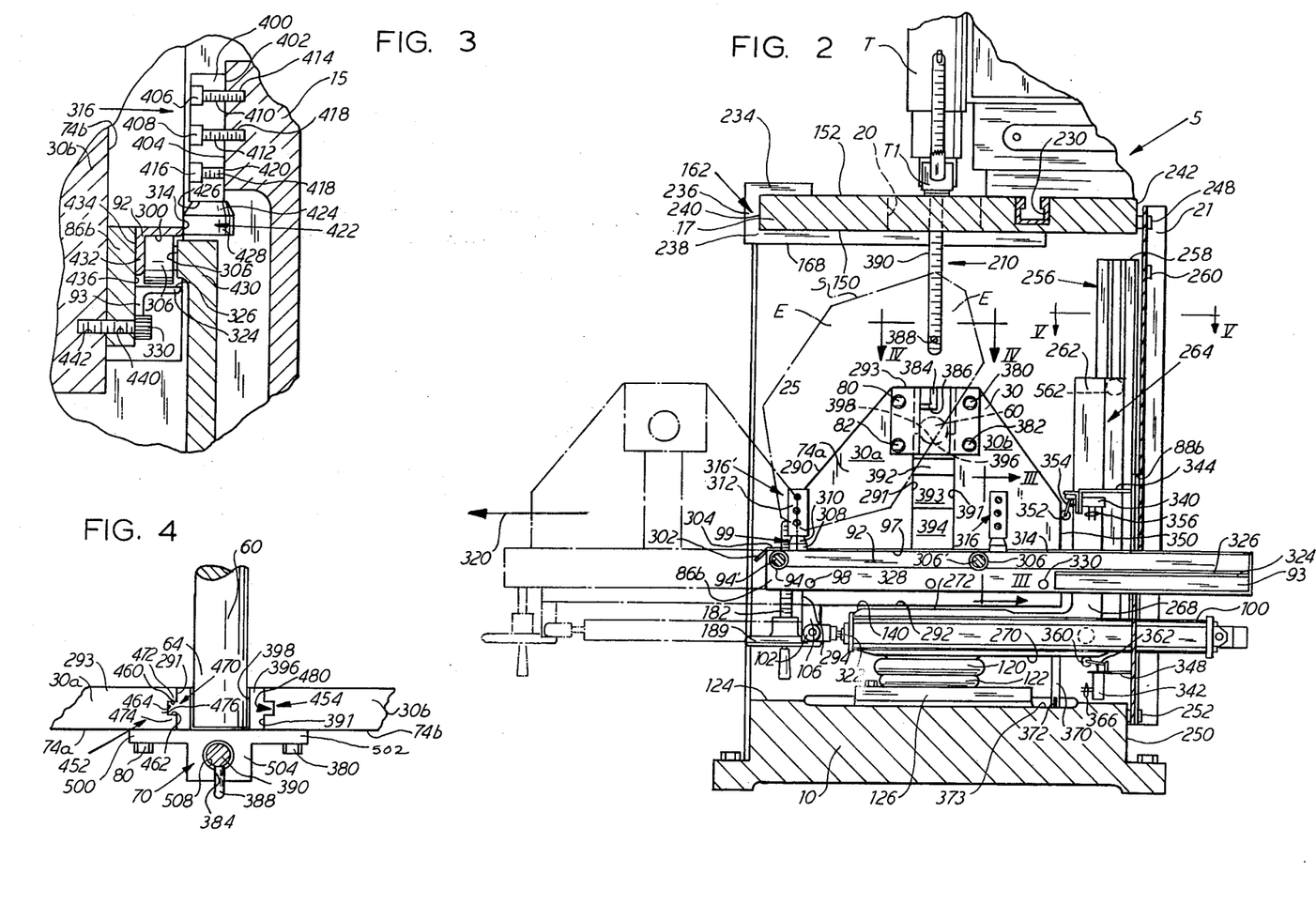
FIG. 2, a section taken along line II—II of FIG. 1, shows an interior view of the fixture of the present invention.
FIG. 3, a section taken along line III—III of FIG. 2, shows the detail of the cradle support and guide rollers.
FIG. 4, a section taken along line IV—IV of FIG. 2, shows the detail of the cradle side keyway.

FIG. 2, a section taken along line II—II of FIG. 1, shows some of the interior detail of the fixture 5. The top cast iron member 17 with the two parallel surfaces 150, 152 is shown. The tool T is shown mounted in a track 230 of a conventional type used for machine slides. The slide 230 permits the tool T to slide along the top surface 152 of the cast iron member 17 in order to bore cylinders C1 through C4 successively.

The U-shaped member 162 which is identical to the U-shaped member 160, is shown, having a top member 234, a central connecting member 236, and a lower elongated member 238. The lower elongated member 238 has the lower ground surface 168. As can be seen from FIG. 2, the lower elongated member 238 extends from a front surface 240 of the member 17 toward a rear surface 242 of the member 17 so that as much as possible of the ground surface 168 may be placed adjacent the surface S of the engine block E when the block E is fixtured in position for boring.

The rear steel plate 21 is shown attached to the rear surface 242 of the member 17 by a screw 248. Additionally, the steel plate 21 is attached to a rear surface 250 of the base member 10 by a second screw 252. The purpose of the steel member 21 is to provide additional rigidity to the base 10, the two parallel side members 12, 15 and the top member 17. A fixed vertical guide member 256 has a top end 258 adjacent a bolt 260 which extends through the steel plate 21 for support. The vertical member 256 is a guide member which receives an elongated section 262 of an L-shaped vertically moving member 264. The member 264 has a lower horizontal portion 268 which is substantially perpendicular to the vertical portion 262.

The horizontal portion 268 of the member 264 has a lower horizontal surface 270 and an upper horizontal surface 272. The lower horizontal portion 268 of the member 264 incorporates the front section 140.

When the air cylinder 120 is inflated, the member 264 is forced upward in the vertical guide member 256. As the member 264 moves upward, the top surface 272 of the lower horizontal section 268 comes in contact with the lower surface 144 of the elongated lifting plate 44. The engine support cradle 25 is thereby lifted upward as the vertical portion 262 of the L-shaped support bracket 264 moves in the guide assembly 256.

FIG. 2 also discloses the construction of the side member 30 of the U-shaped engine support cradle 25. The side member 30 has two sections, the front section 30a and the rear section 30b. The two sections 30a and 30b are identical. A description of 30a will suffice also to describe 30b. Section 30a has a generally triangular shape with a side 290 corresponding to a hypotenuse, a side 291 opposite the hypotenuse 290 and a base 292 perpendicular to the side 291. The surface 290 is joined to the side 291 by a truncated end 293 adjacent the safety plate 70. A second truncated end 294 joins the base 292 to the hypotenuse 290.

FIG. 2 also shows a side view of the slide 86b. The slide 86b is an elongated rectangular member which extends through the port 88b in the rear steel plate 21. The front weight supporting roller 94 with an associated supporting pin 94' is shown abutting the lower surface 97 of the right angle member 92. The right angle member 91 terminates in a lip 302 located at a front end 304 of the right angle member 92.

A rear weight supporting roller 306 is shown in FIG. 2. The rear roller 306 is identical to the front weight supporting roller 94. The roller 306 is supported by a pin 306' and by the side wall 15. The front guide roller 99 can be seen in FIG. 2 as having a lower cylindrical portion 308 connected to an upper tapered portion 310. The upper tapered portion 310 is affixed to a shaft which is rigidly connected by a plate 312 to the side 15. As the guide roller 99 rotates, the cylindrical portion 308 guides a narrow elongated edge 314 of the right angle bracket 92 keeping the cradle 25 in proper alignment for extension and retraction. A rear guide roller assembly 316 is identical to the front guide roller 99 and supporting structure 312.

When the cradle 25 has been extended laterally in a direction 320 by a piston 322 of the air cylinder 100 the lower right angle member 93 of the slide 86b becomes effective. The lower guide member 93 has a horizontal section 324 which has an upper surface 326 which will contact the bottom side of the rear weight supporting roller 306. The purpose of the lower guide member 93 is to prevent the cradle 25 from rotating and falling off of the roller 94 when the cradle 25 has been extended by the piston 322 of the air cylinder 100. The lower surface 97 of the upper right angle bracket 92 which rests on the upper side of the weight bearing rollers 94 and 306, does not clamp the slide 86b to the rollers 94 and 306. In fact, when the cradle 25 has been extended vertically so that the engine block E is clamped in position to be bored, the right angle member 92, and the slide 86b, which are affixed to the side 30 of the U-shaped cradle 25, are lifted off of the rollers 94 and 306. When the engine cradle 25 has been extended in a direction 320 by the piston 322 of the air cylinder 100, the cradle 25 would be free to pivot about the front roller 94 and the corresponding front roller associated with the guide 86a, toward the floor. However, right angle bracket 93 with the horizontal member 324 having the horizontal surface 326 will engage the lower side of the weight supporting roller 306 when the engine support cradle 25 has been extended in the direction 320 thereby blocking any pivoting about the roller 94. Additional screws 328, 330 cooperate with the screw 98 to hold the slide 86b against the surface 74 of the side member 30.

A pair of safety switches 340, 342 are affixed to the rear steel plate 21 by a pair of brackets 344, 348, respectively. The switches 340 and 342 are normally open limit switches.

The switch 340 can be activated and closed when a surface 350 of the rear plate 45 contacts a roller cam 352 attached to an actuating arm 354 of the switch 340. The purpose of the switch 340 is to detect when the engine support cradle 25 has been fully retracted opposite the direction 320 within the region 22. The normally open switch 340 is closed when the surface 350 forces the roller 352 backwards toward the steel plate 21. When closed, an electrical signal may be passed through the switch 340 on a pair of wires 356. When the switch 340 is closed and an electrical signal is passed through the control panel 200, the air cylinder 120 which elevates the engine support cradle 25 may be expanded.

The second normally open limit switch 342 is activated when the lower surface 270 of the horizontal member 268 of the L-shaped support bracket 264 comes in contact with a cam roller 360 affixed to an actuating arm 362 of the limit switch 342. The limit switch 342, normally open, detects the presence of the lower surface 270 of the L-shaped support bracket 264 by closing thereby permitting an electrical signal on a pair of wires 366 to indicate that the engine support cradle 25 has been returned to its lowered position. When the switch 342 is closed, the control circuitry in conjunction with the control panel 200 may be activated to cause the piston 322 of the horizontal air cylinder 100 to extend in the direction 320 thereby extending the cradle 25 and permitting removal of the engine block E.

An elongated rectangular member 370 is attached at a first end 372 to a horizontal surface 373 of the base 10. The purpose of the member 370 is to provide a safety stop for the cradle 25. As the L-shaped support member 264 moves downwardly toward the surface 124 of the base 10, the stop 370 would mechanically prevent the engine cradle 25 from collapsing onto the air cylinder 120, perhaps destroying it.

As can be seen from FIG. 2, the air cylinder 100 also extends through the rear steel plate 21.

The safety plate 70 which is affixed by the bolts 80, 82 to the front portion 30a of the side member 30 is also affixed to the rear portion 30b of the side member 30 by a pair of bolts 380, 382. The safety plate 70 has a vertical slot 384 which intersects a horizontal slot 386. The purpose of the slots 384, 386 is to provide a means whereby a lateral extension 388 affixed to the threaded shaft 390 which is a part of the safety support 210 may engage the safety plate 70 thereby providing a source of mechanical support to the engine cradle 25 when it is extended so that the engine block E may be bored.

Below the safety plate structure 70 and between the surface 291 of the front side member 30a and a corresponding surface 391 of the rear side plate 30b are a set of adjusting shims 392, 393, 394. The shims 392, 393 and 394 are shown stacked upon one another between the edges 291 and 391. The shim 392 has a height of one inch, the shim 393 has a height of two inches and the shim 394 has a height of three inches. The purpose of the shims 392 through 394 is to permit vertical adjustment of the ground elongated supporting bar 60 which provides the primary support for the engine support block E. A top bar support member 396 which rests on the selected ones of the shims 392-394 or some combination thereof has a semicircular surface 398 with the radius of curvature corresponding to the radius of curvature of the bar 60. The member 396 directly supports the bar 60 and the height of the bar 60 can then be adjusted by the shims 392 through 394. The selected shims 392-394 depend on the characteristics of the engine block E such as its height and whether it is a V-type engine or an in-line engine.

FIG. 3, a section taken along the line III—III shows the detail of the cradle support rollers such as the rollers 94, 306 and the cradle guide roller assembly such as the guide roller assembly 316. The guide roller assembly 316, which is identical to the front guide roller assembly 316' and which is identical to the other two guide roller assembly at the other end of the engine support cradle 25, has an elongated vertical mounting member 400 which has a first elongated surface 402 located adjacent a corresponding elongated surface 404 of the side 15. A pair of screws 406, 408 passes through a pair of holes 410, 412 of the elongated member 400 and into a pair of threaded holes 414, 418 near the surface 404 of the side member 15. The screws 406, 408 hold the elongated supporting member 400 adjacent the surface 404 of the side member 15. A third screw 416 which passes through a threaded hole 418 in the elongated member 400 terminates with an end 420 adjacent the surface 404. The screw 416 is an adjustment screw which can be used to move the guide wheel 422 a small amount with respect to the guide surface 314 of the upper right angle support bracket 92. The guide wheel 422 has an upper tapered portion 424 adjacent a first end 426 of the elongated support member 400. A lower cylindrical portion 428 of a guide wheel 422 is located adjacent the surface 314 for guiding purposes.

The weight bearing roller 306 which has a cylindrical shape, is rotatably attached by the shaft 306' to an attachment stud 430 in the side wall 15. The weight bearing roller 306 has a horizontal axis of rotation and is adjacent the lower horizontal surface 300 of the right angle bracket 92. The bracket 92 has a vertical member 432 which has a surface 434 which is located adjacent a surface 436 of the slide 86b. The lower right angle support bracket 93 has the upper horizontal surface 326 which becomes adjacent the lower side of the roller 306 when the side member 30b of the engine support cradle 25 is moved laterally in the direction 320 out of the region 22. The slide 86b is attached to the surface 74b of the side member 30b by the cap screw 330 which extends through a hole 440 in the slide 86b and into a threaded hole 442 in the side member 30b.

FIG. 4, a section taken along line IV—IV of FIG. 2 shows the end 64 of the ground elongated support bar 60 resting on the surface 398 of the bar support member 396. The member 396 is located between the side member 30a and the side member 30b. The side member 30a has keyway 452 cut in the surface 291. A comparable keyway 454 has been cut into the corresponding surface 391 of the side member 30b. The purpose of the two keyways 452, 454 is to provide alignment and to retain the bar support member 396 as well as the selected combination of shims 392 through 394.

The keyway 452 is identical to the keyway 454 and a description of the keyway 452 will apply to the keyway 454. The keyway 452 has a pair of parallel sides 460, 462 joined by a perpendicular end 464. The bar support member 396 and each of the shims 392 through 394 has a corresponding key, such as a key 470 associated with one side of the bar support member 396. The key 470 has a pair of parallel sides 472, 474 which are adjacent the two parallel sides 460, 462 of the keyway 452. The key 470 also has a perpendicular end 476 which is adjacent the end 464 of the keyway 452. A second key 480 is aligned with the keyway 454 of the side member 30b. Each of the shims 392–394 has a pair of keys corresponding to the keys 470, 480 of the bar support member 396.

FIG. 4 also shows the detail of the safety plate 70. The plate 70 is affixed to the surfaces 74a, 74b of the respective side members 30a, 30b by a set of bolts 80,82,380,382. A pair of rectangular flanges 500,502 are integrally attached to a body portion 504. The retaining bolts 80, 82, 380 and 382 pass through a corresponding set of holes in the flanges 500, 502 and into a set of threaded holes in the side members 30a and 30b. In the body member 504 of the safety plate 70 is a boring 508 of large enough diameter such that the threaded screw member 390 may slide through the boring 508 as the engine support cradle 25 is being raised by the air cylinder 120. As the threaded screw member 390 enters the boring 508 the lateral extension 388 on the screw member 390 passes through the vertical slot 384 in the body member 504. When the engine block E has been raised to its boring position, the lateral extension 388 will be adjacent the horizontal slot 386. Rotating the screw member 390 a quarter of revolution will bring the lateral extension 388 within the horizontal slot 386 thereby mechanically locking the cradle 25 in boring position even if the air cylinder 120 should fail.

Figure 5:
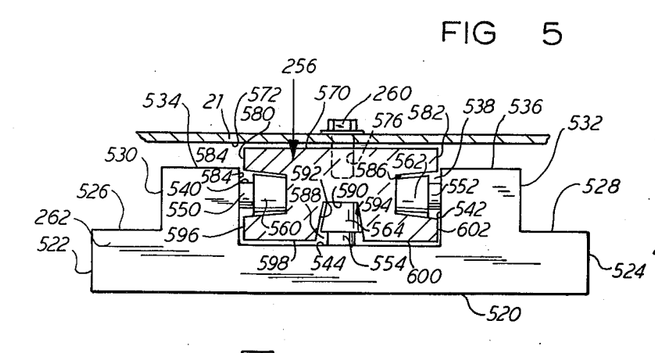
FIG. 5, a section taken along line V—V of FIG. 2, shows the detail of the cradle vertical guide apparatus.

FIG. 5, a section taken along line V—V of FIG. 2 discloses the detail of the vertical member 262 of the L-shaped support bracket 264 which raises the engine cradle 25 vertically in response to inflation of the air cylinder 120. The member 262 is shown in relationship to the vertical slide 256. The member 262 has a first elongated straight side 520 which intersects a pair of parallel sides 522, 524 each of which is perpendicular to the elongated side 520. A pair of shorter surfaces 526, 528 each of which is parallel to the elongated side 520, is perpendicular to the sides 522, 524. A third pair of surfaces 530, 532 is perpendicular to the pair of surfaces 526, 528. A fourth pair of edges 534, 536 is perpendicular to the third pair of edges 530, 532. An interior region 538 is formed in the member 262 and has a pair of parallel sides 540, 542 which intersects a perpendicular side 544. The two sides 540, 542 intersect perpendicularly the fourth set of edges 534, 536. The interior surface 544 is parallel to the elongated surface 520. Each of the interior surfaces 540, 542, 544 supports, by a shaft 550, 552, 554 respectively, a tapered bearing 560, 562, 564, respectively. As the member 262 is raised and lowered vertically by pressurizing the air cylinder 120, the tapered rollers 560, 562, 564, cooperate with the guide member 256 to keep the vertically moving member 264 aligned and moving with minimal friction.

The guide member 256 has a first elongated straight edge 570 which is held adjacent a flat surface 572 of the rear steel plate 21 by the screw 260 which extends into a threaded boring 576 of the guide member 256. A first pair of surfaces 580, 582 is perpendicular to and intersects the surface 570. The guide member 256 has a set of three regions 584, 586 and 588 which receive respectively the set of three guide rollers 560, 562 and 564.

The three regions 584, 586 and 588 are identical and a description of the region 588 will describe the other two. The region 588 has a rear straight surface 590 which is intersected by a pair of straight surfaces 592, 594. The surfaces 592, 594 intersect the rear surface 590 at an acute angle corresponding to the angle of taper of the rollers 560 through 564.

The regions 584–588 are distributed on the member 256. The edge 580 terminates at the region 584. Between the region 584 and the region 588 is an edge 596 parallel to the edge 580 and an intersecting edge 598 perpendicular to the edge 596. The edge 598 terminates in a region 588. Between the region 588 and the region 586 is a straight edge 600 which intersects a perpendicular edge 602 which terminates in the region 586. The edges 598 and 600 are parallel to the edge 544. The edges 580, 596, 602 and 582 are parallel to the edges 540 and 542.

Figure 6:
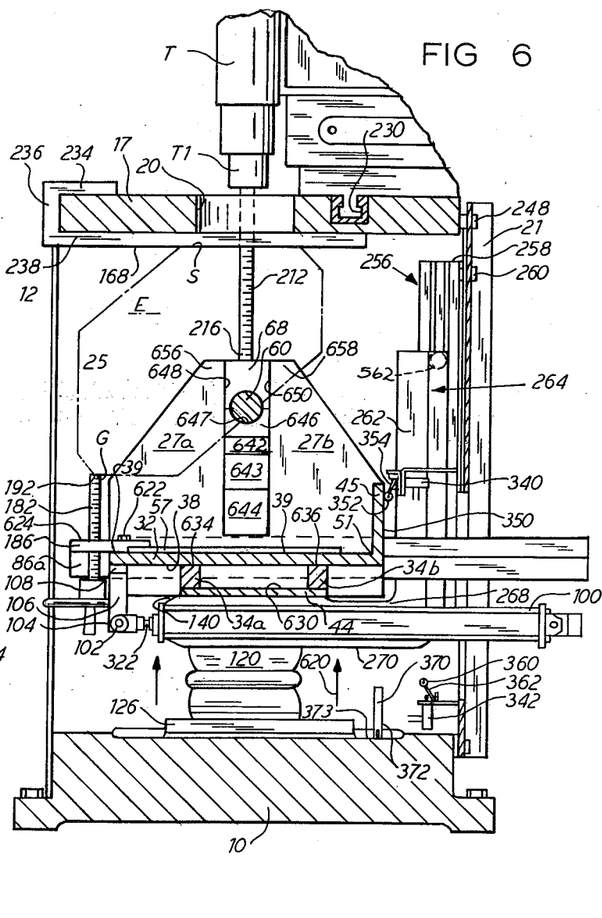
FIG. 6, a section taken along line VI—VI of FIG. 1 is a side view of the fixture of the present invention with the cradle assembly in its raised condition.

FIG. 6, a section taken along line VI—VI of FIG. 1 further discloses the structure of the engine support cradle 25 when the cradle 25 has been raised in a vertical direction 620 so that the surface S of the engine block E is located adjacent the surfaces 164, 168 of the U-shaped members 160, 162. In this condition the engine block E is partly supported by the threaded screw 182 where the end 192 of the screw 182 intersects the lower surface G of the engine block E. As is shown in FIG. 6, the supporting bracket 186 is attached to the top surface 39 of the floor 32 of the engine support cradle 25. A locking bolt 622, which is behind the threaded shaft 182, extends downwardly into a threaded boring in the floor 32 from a top side 624 of the bracket 186.

The T-shaped bracket 106 with the top member 108 is shown attached to the lower surface 38 of the floor 32 of the engine support cradle 25. The stem 104 of the T-shaped bracket 106 is shown connected through the coupling 102 to the piston 322 of the bi-directional air cylinder 100.

The floor 32 of the engine support cradle 25 is lifted in the direction 620 by the horizontal member 268 of the L-shaped elevation bracket 264. The bracket 264 is in turn lifted by the air cylinder 120. The cylinder 120 applies upward force along the surface 270 to the elongated U-shaped lifting bracket with the elongated front member 34a, the elongated lower plate 44, and the elongated rear member 34b substantially identical to the elongated front member 34a. The member 34a is welded to a top surface 630 of the support plate 44. The member 34b, substantially identical with the member 34a is also welded to the surface 630. At a second end 634, 636 the members 34a, b, respectively, are also welded to the lower surface 38 of the floor 32 of the engine support cradle 25. The structure composed of the members 34a, b and 44 provides an elongated lifting bracket which runs the entire length of the floor 32 of the engine cradle 25 thereby providing a convenient and efficient means whereby the lifting member 264 may, when raised in the direction 620 by the air cylinder 120, lift the engine support cradle 25.

The safety stud 370 which is welded to the surface area 373 of the lower cast iron base 10 is shown in FIG. 6 directly behind the air cylinder 120.

Between the two side members 27a, 27b of the engine support cradle 25 is shown a second set of three support shims 642, 643, 644, respectively, of 1 inch, 2 inches, and 3 inches in height. The shims 642–644 corrspond to the supporting shims 392–394 located between the two side members 30a and 30b. Located on top of the shim 642 is a second support member 646 for the bar 60 having a semi-circular surface 647 corresponding to the outer radius of the bar 60. The bar support member 646 is substantially identical to the bar support member 396 between the side members 30a and 30b.

The shims 642 through 644 as well as the bar support member 646, are all mechanically retained between the side member 27a and the side member 27b by a pair of keyways substantially identical to the keyways 452 and 454 between the members 30a and 30b. In FIG. 6 a pair of edges 648, 650 of the second keyway can be seen. FIG. 6 also shows the rear of the safety plate 68 which connects an upper region 656 of the side member 27a to an upper region 658 of the side member 27b as does the safety plate 70 between the side members 30a and 30b. The threaded bar 212 of the mechanical safety interlock 205 is also shown extending into a boring in the safety plate 68 corresponding to the boring 508 in the safety plate 70.

FIG. 6 further discloses that when the cradle 25 is in the elevated condition the surface 270 on the lower side of a horizontal member 268 of the lifting structure 264 no longer depresses the roller 360 on the arm 362 of the switch 342. The switch 342 is a normally open limit switch whose purpose is to detect the fact that the engine support cradle 25 is in its lowered as opposed to its elevated condition as shown in FIG. 6. Thus, in FIG. 6 the switch 342 will be open and will prevent actuation of the air cylinder 100 to bring about a lateral movement in the direction 320 of the engine support cradle 25.

It should further be noted that the switch 340 continues to be held closed when the engine support cradle 25 is in the elevated position since the rear surface 350 of the back plate 45 of the engine support cradle 25 is still in contact with the roller 352 attached to the arm 354 of the switch 340. It is only because the switch 340 is held closed that the air cylinder 120 can be inflated to elevate the cradle 25.

In FIG. 6 the slide 86a, which is adjacent the side member 12, is shown extending rearward through the rectangular slot 88a in the rear steel panel 21.

Figures 7, 8:
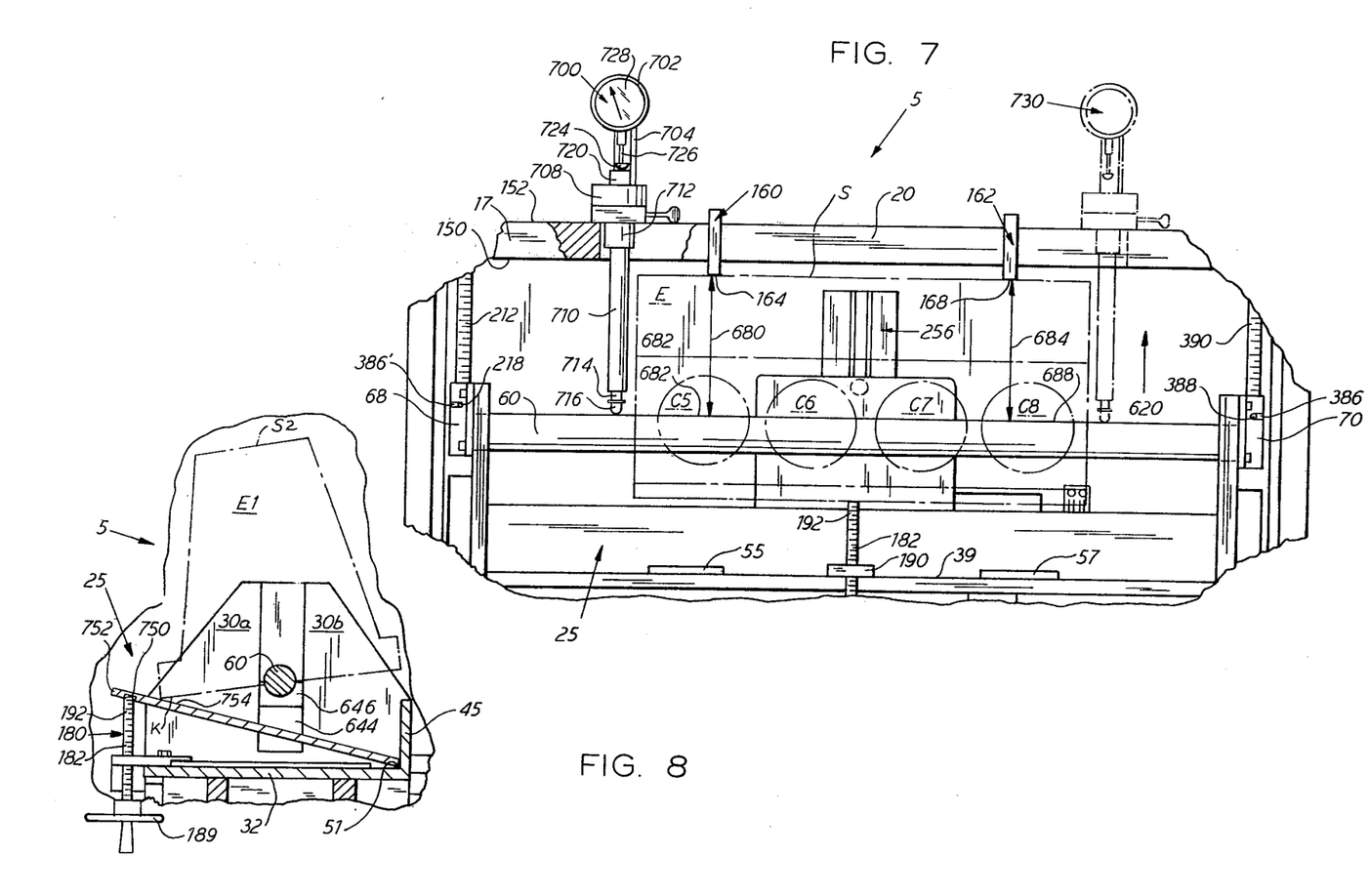
FIG. 7, a partial front elevation shows the use of indicator gauges with the present invention.
FIG. 8, a partial enlarged side elevation shows the fixture of the present invention used with an in-line engine block.

FIG. 7 shows the engine boring fixture 5 being used to check the alignment of the engine block E before the tool T is used to bore the cylinders C1 through C4. It is desired that the cylinders C1 through C4 be bored square with respect to the bar 60 which will eventually be replaced by the crankshaft for the engine block E. To insure that cylinders C1 through C4 are bored perpendicular to the bar 60, the engine fixture 5 may be used to check two distances, a distance 680 between the surface 164 of the U-shaped measuring member 160 and a top region 682 of the bar 60. The distance 680 is then compared to a distance 684 measured between the ground surface 168 of the U-shaped measuring member 162 and a region 688 at the top of the elongated supporting bar 60. If the measured distances 680, 684 are the same, then the borings of the cylinders C1 through C4 in the engine block E made by the tool T will be perpendicular or square with the elongated supporting rod 60. If for some reason there is a difference between the distances 680, 684 shims may be used to adjust the engine block E so as to square the cylinders C1 through C4 with respect to the elongated supporting bar 60.

The means for measuring of the distances 680, 684 is not critically to the invention as described herein so long as whatever means is used is accurate enough so that the equality or inequality of the distances 680, 684 may be accurately detected. A preferred indicator mechanism 700 is indicated as resting on the surface 152 of the upper cast iron member 17. The gauge mechanism 700 has a standard machinist type indicator gauge 702 mounted in a bracket 704 which is in turn affixed to a base 708 which may be placed upon the surface 152 of the top member 17. An extension 710 is affixed to a lower cylindrical region 712 of the base 708. Within the extension tube 710 and operable to move longitudinally therein is a measurement sensor 714 with a lower sensing end 716 which is effective to sense the region 682 of the bar 60. An upper end 720 of the measurement sensor 714, which is rigidly connected to the end 716 moves in conjunction with the end 716 to deflect a sensor 724 at the end of a longitudinal movable shaft 726 of the indicator 702. The shaft 726 is connected to the indicator mechanism 702 in a conventional fashion so that a measurement may be made by a measurement dial 782 on the indicator mechanism 702. The dial 728 indicates a measurement proportional to the distance between the surface 152 and the surface 682 of the bar 60.

It will be understood, of course, that except for the addition of known constant, the distance 680 corresponds to the distance between the top horizontal surface 152 and the surface 682 of the bar 60. Shown in phantom in FIG. 7 is a second indicator structure 730 which can be the same as the indicator mechanism 700. Once the engine block E has been raised in the direction 620 so that the surface S is in contact with the surfaces 164 and 168 the distances 680 and 684 will not change, but will remain constant. Thus, the indicator mechanism 700 can be placed as shown in FIG. 7. Once a measurement has been made off of the dial 728 the mechanism 700 may be placed where the mechanism 730 is shown and a second measurement made. The two distances which directly correspond to the distances 680, 684 can then be compared. Alternately two indicator mechanisms 700, 730 can be used and the measures made simultaneously.

It should be noted, as shown in FIG. 7, that when the engine block E has been elevated in the direction 620 and fixtured for boring that the two lateral extensions 218 and 388 affixed to the threaded safety bars 212 and 390 respectively are located in the horizontal slots 386', 386 of the safety plates 68, 70, respectively. A mechanical support is thus provided for the engine block E and the engine support cradle 25 during the boring operation.

The previous discussion of FIGS. 1 through 7 has been with respect to the exemplary engine block E which is a V-8 type engine block. The engine fixture 5 is designed to be used also with in-line engines.

FIG. 8 discloses an engine block E1 of the in-line type mounted on the cradle 25 of the engine boring fixture 5. The elongated ground supporting bar 60 is located in a corresponding position with respect to the engine block E1. One difference between the configuration of the engine support cradle 25 when supporting the engine block E1 as opposed to the V-type engine block E is that the member of shims used from the two sets 392–394 and 642–644 are different to compensate for the fact that in-line engine blocks such as the block E1 are physically taller than V-type engine blocks. In FIG. 8 only a single shim, the three-inch shim 394 along with the corresponding three-inch shim 644, is used to adjust the height of the bar 60. The shim 644 supports the bar support block 646. The shim 394, not shown, supports the bar support block 396 in a similar fashion.

Because the in-line engine blocks, such as the block E1, are not as wide as the V-type blocks, such as the block E, the auxiliary block support mechanism 180 is modified so as to be operative when in-line blocks are to be fixtured for boring. A plate 750 is located between the top end 192 of the threaded bar 182 and the rear corner 51 between the floor 32 and the rear plate 45. The hand wheel 189 may be used to raise the height of the end 192 of the threaded screw 182 thereby raising an external end 752 of the plate 750. As a result, a top surface 754 of the plate 750 forces a lower corner K of the engine block E1 upward making it possible to align a top surface S2 of the engine block E1 with the measurement surfaces 164 and 168 of the U-shaped measurement bars 160, 162.

The engine fixture 5, as will be recognized by those skilled in the art, may be readily modified to deal with additional engine configurations in addition to the V-type block E and the in-line block E1 disclosed herein.

Figure 9:
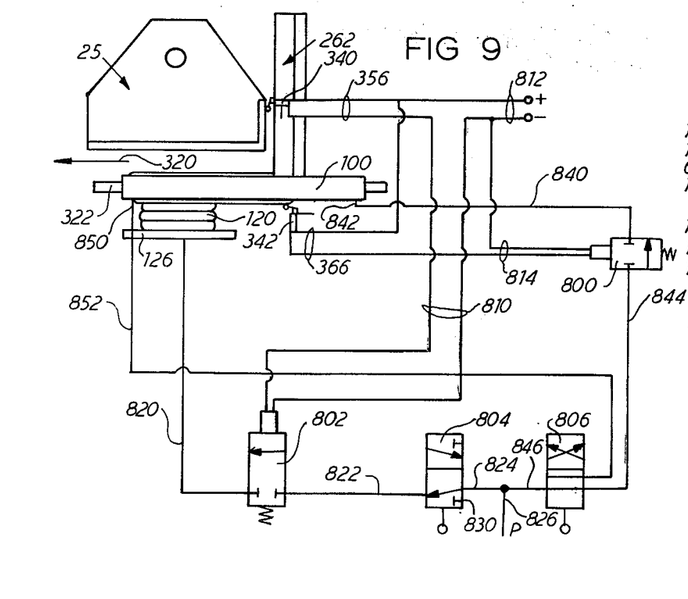
FIG. 9 is a pneumatic-electrical schematic for controlling the two air cylinders utilized in the present invention.

A sample electrical and pneumatic control diagram for the engine boring fixture 5 is disclosed in FIG. 9. A pair of solenoid control valves 800, 802, a vented pneumatic control valve 804, and a two-way pneumatic control valve 806 are interconnected through the control panel 200 for the purpose of actuating the lateral movement two-way air cylinder 100 on the vertical air cylinder 120.

The solenoid activated switch 802 is connected by a set of electrical control lines 810 to the normally open switch 340 and to a source of potential 812. The solenoid valve 800 is connected by a pair of control lines 814 to the normally open switch 342 and to the source of potential 812.

When the engine support cradle 25 is in its retracted position as shown in FIG. 9, normally open switch 340 is closed. In this condition, it is desirable to be able to inflate the air cylinder 120. With the switch 340 closed power may be supplied to the solenoid valve 802 through the control lines 810 from the source of potential 812. Solenoid valve 802, normally blocking, will be moved to the open position and, provided that control valve 804 is also moved to its open position, air pressure may be applied to the cylinder 120 through an air line 820 connecting the air cylinder 120 with the valve 802, and air line 822 connecting the solenoid valve 802 with the control valve 804 and through an air line 824 which connects the control valve 804 to a source of pressure 826. When air pressure is so applied, the cradle 25 will move upwardly in the direction 620 so that the block may be bored.

After the engine boring operation has been completed, and it is desired to lower the engine support cradle 25, the pneumatic control valve 804 is moved from its open position, wherein pressure may pass from the source of pressure 826 through the line 824 through the line 822, the solenoid valve 802 and the line 820 into the air cylinder 120, to a vented position where air pressure may be bled from the air cylinder 120 through the line 820, the valve 802, the line 822 and out through a vent port 830 of the valve 804. In this condition the weight of the engine block or the engine support cradle 25 alone will cause the air cylinder 120 to be compressed. When the cylinder 120 has been compressed adequately due to the downward movement of the engine support cradle 25 the normally open limit switch 342 will be closed indicating that the cradle 25 has returned to a lowered position.

When the switch 342 is closed, power may be applied from the source of potential 812 through the wires 366 and through the wires 814 to the solenoid actuated valve 800. The valve 800 must be moved from its blocking position before the piston 322 of the air cylinder 100 may be permitted to move in the lateral direction 320 thus extending the engine support cradle 25. If the valve 800 is moved away from its normal blocking position due to power being applied on the lines 814, pneumatic pressure may be applied through an air line 840 which connects a first input port 842 of the air cylinder 100 to the valve 800 and through a second air line 844 which connects the electrically operated valve 800 to the control valve 806. When the control valve 806 is moved to a first position, air from a source of pressure 826 may be applied along a line 846 through the valve 806 to the line 844, through the valve 800, through the line 840 and into the port 842. When pressure is applied through the port 842 the piston 322 of the two-way air cylinder 100 will be driven in the direction 320.

As soon as the engine support cradle 25 moves in the direction 320, the normally open switch 340 resumes its open position, thereby disabling the solenoid valve 802 and blocking any air pressure from being applied from the source of pressure 826 through the valve 802 to the air cylinder 120. Thus, when the engine support cradle 25 has been moved in the direction 320 pressure may not be applied to the cylinder 120 in an attempt to raise the engine support cradle 25.

To retract the engine support cradle 25, opposite the direction 320, air pressure must be applied to a second port 850 of the two-way air cylinder 100. Air pressure is applied to the port 850 along a line 852 which connects the port 850 to the control valve 806. When the control valve 806 is placed into a second position, the source of pressure 826 can supply pressure along the line 846, through the control valve 806 and to the line 852 which is connected to the port 850.

Simultaneously, the port 842 is vented through the line 840, the solenoid valve 800, the line 844 and the control valve 806. Venting of the port 842 is desirable so that the pressure in the cylinder 100 which brought about the extension in the direction 320 of the piston 322 of the cylinder 100 does not impede the retraction of the piston 322 in a direction opposite the direction 320.

Alternately, a purely mechanical control system could be used replacing the electrical switches 340, 342 and the electrically operated valves 800, 802. In this alternate control system mechanical switches 340, 342 open and close to permit the flow of air therethrough.

For example, the switch 340 can be activated and closed when a surface 350 of the rear plate 45 contacts a roller cam 352 attached to an actuating arm 354 of the switch 340. The purpose of the switch 340 is to detect when the engine support cradle 25 has been fully retracted opposite the direction 320 within the region 22. The normally closed switch 340 is opened when the surface 350 forces the roller 352 backwards toward the steel plate 21. When opened, air may be passed through the switch 340 and the air cylinder 120 which elevates the engine support cradle 25 may be expanded.

The second normally closed limit switch 342 is activated when the lower surface 270 of the horizontal member 268 of the L-shaped support bracket 264 comes in contact with a cam roller 360 affixed to an actuating arm 362 of the limit switch 342. The limit switch 342, normally closed, detects the presence of the lower surface 270 of the L-shaped support bracket 264 by opening thereby permitting air to flow to the position of the air cylinder when the engine cradle 25 has returned to its lowered position. When the switch 342 is opened, the control circuitry in conjunction with the control panel 200 may be activated to cause the piston 322 of the horizontal air cylinder 100 to extend in the direction 320 thereby extending the cradle 25 and permitting removal of the engine block E.

The fixture 5 could also be modified so that both sides of a V-type block could be bored without removing the block from the fixture 5. In this alternate embodiment, the rear panel 45 is removed and a second support identical to the support 180 is centrally mounted at the rear edge 39 of the floor 32. When a first set of cylinders of a V-type block such as exemplary cylinders C1–C4 of block E of FIG. 1 has been bored, the block is rotated on the support bar 62 in order that the second set of cylinders C5–C8 might be bored without removing the block E from the fixture 5.

While various suggestions, modifications or equivalent structures may be proposed by those skilled in the art, it will be understood that we wish to include within the scope of the claims of the patent warranted hereon all such modifications, changes or improvements as reasonably come within the scope of our contribution to the art.

We claim as our invention:

1. Apparatus for aligning a center of rotation of a crankshaft of an internal combustion engine block perpendicular to a selected direction of travel of a boring tool comprising:
    engine support means operative to support the engine block to be bored;
    a means for alignment;
    alignment support means attached to said engine support means operative to support said means for alignment and orient it so as to include a plane perpendicular to the selected direction of travel of the boring tool;
    said engine support means operative to raise and lower said engine and to position a selected surface of the engine block in contact with said means for alignment;
    means for sensing located on said alignment support means, said means for sensing being adapted to sense a difference in spacing between, a first selected region of said engine support means and a first selected region of said alignment support means, and a second selected region of said engine support means and a second selected region of said alignment support means when the selected surface of the engine block to be bored is supported adjacent said means for alignment;
    whereby said sensed difference might be minimized or eliminated so that the center of rotation of the crankshaft of the engine block would be perpendicular to the direction of travel of the boring tool.

2. Apparatus according to claim 1, having further means for moving, at least a selected part of said engine support means, a predetermined distance toward said alignment support means.

3. Apparatus according to claim 2 wherein said engine support means includes:
    a rigid, elongated bar supported at a first and a second end by said engine support means, perpendicular to the selected direction of travel of the boring tool, and operative to support the engine block to be bored at a first and a second selected engine surface.

4. The apparatus according to claim 2 wherein said means for moving includes
    a pneumatic air cylinder with a movable piston;
    said piston being operatively attached to said selected, movable part of said engine support means, with said cylinder being attached to a fixed portion of said engine support means.

5. The apparatus according to claim 1 wherein said means for alignment comprises:
    a first and a second alignment surface, each slidably attached to said alignment support means, so as to be slidable longitudinally with respect to the engine block to be bored, said pair of surfaces each defining a selected plane perpendicular to the selected direction of travel of the vertically movable tool.

6. An apparatus for aligning a center of rotation of a crankshaft of an internal combustion engine block perpendicular to a first direction of motion of a boring tool comprising:
    an elongated engine support means movably mounted on a lower, rigid, support structure;
    said elongated engine support means being operable to move in said first direction or opposite said first direction of motion of the boring tool under control of means for moving;
    whereby said engine support means is operable to support the engine block to be bored at a first and a second selected surface of the engine block so that the center of rotation of the crankshaft of the engine block is substantially perpendicular to the first direction of motion of the boring tool;
    an upper rigid support structure, attached to said lower rigid support structure, and supporting an alignment surface attached thereto;
    said alignment surface defining a plane perpendicular to said first direction of motion of the boring tool;
    said means for moving is adapted to move said elongated engine support means upwardly in order to bring a third selected surface of the engine block into contact with said alignment surface;
    means for sensing adapted to be positionable on said upper rigid support structure and operative to measure a first distance between a first end region of said elongated engine support means and a selected first region of a first end of said upper rigid support structure and a second distance between a second end region of said elongated engine support means and a selected second region of a second end of said upper rigid support structure when the engine block to be bored is supported by said engine support means and when the third selected surface of the engine block is in contact with said alignment surface.

7. A machine on which the centerline distance, between the crankshaft bearings and the top of an engine block, on either end of the block, may be measured to insure that a cylinder hole to be bored is square with the crankshaft, comprising:
    a housing having a base, a pair of side members perpendicular to said base and a top horizontal member substantially parallel to said base;

said top member having at least one planar surface selectively located thereon;

a means for engine block support movably mounted within said housing and operable to support the engine block at a pair of selected support surfaces, said means for engine block support including a means for positioning operable to locate a third selected surface of the engine block adjacent and in contact with said planar surface of said top member;

means for measuring adapted to be positionable on said top member and operative to measure a first and a second distance, said first distance being perpendicularly measured between said planar surface of said top member and said means for engine block support in a region adjacent a first of the selected support surfaces of the engine block, said second distance being perpendicularly measured between said planar surface of said top member and said means for engine block support in a region adjacent a second of the selected support surfaces of the engine block.

8. The machine according to claim 7 wherein said means for engine block support includes:

an elongated support bar capable of supporting the block at the saddles of the crankshaft bearings of the engine block;

said bar being supported at a first and a second end by said means for engine block support substantially parallel to said planar surface of said top member.

9. The machine according to claim 8 wherein said means for positioning includes a pneumatic cylinder operable to move said elongated support bar, supporting the block, toward said planar surface to bring the third selected surface of the engine block into contact with said planar surface of said top member.

10. The machine according to claim 9 wherein the third selected surface is a surface located adjacent an end of a selected bank of cylinders of the engine block to be bored and wherein said means for measuring comprises machinist's gauge.

11. The machine according to claim 7 wherein said means for engine block support includes a pair of slides, each having a horizontal orientation and operable to permit a selected section of said means for engine block support to be extended, horizontally, with respect to and out of said housing whereby an engine block to be bored might easily be placed onto said means for engine block support.

12. The machine according to claim 8 wherein said means for engine block support includes further:

an engine support cradle with a floor and a first and a second side wall, perpendicular with and attached to said floor;

a first and a second set of shim blocks;

each said side wall having a vertical slot therein and each said slot including means for mechanically retaining selected members of a said set of shim blocks;

said first and said second end of said elongated support bar being supported respectively by selected members of said first and said second set of shim blocks in spaced relation to said floor of said engine support cradle.

13. An engine boring fixture for clamping an engine block whose cylinder or cylinders are to be bored comprising:

a housing enclosing a central region, said housing having a base, a top member and two parallel side members supporting said top member in spaced relation to said base;

said top member having a planar surface adjacent said central region;

an engine support cradle having an elongated floor and two parallel sides one affixed to each end of said elongated floor;

an elongated, rigid, cylindrical engine support bar, capable of substantially supporting an engine block to be bored, by a first and a second crankshaft bearing saddle located respectively at a first and a second end of the engine block;

said engine support bar having a first and a second end with each of said ends being supported by support means associated with a respective one of said two parallel sides;

said engine support cradle being supported within said central region by a means for vertical support, said means for vertical support being operable to move said engine support cradle, with an engine block to be bored placed thereon, vertically with respect to said planar surface whereby a selected top surface of the engine block, adjacent the cylinder or cylinders to be bored, is brought into contact with said planar surface of said top member;

means for measuring positionable on said housing and adapted to measure, at each end of the block, a distance proportional to the distance between said planar surface of said top member and a centerline of said cylindrical engine support bar.

14. The engine boring fixture, according to claim 13, wherein each said engine bar support means associated with each said one of said two parallel sides comprises:

a set of shims removably affixed to said respective side member.

15. The engine boring fixture according to claim 14 wherein:

said engine support cradle has further a first and a second slide means, each attached to a respective one of said two parallel sides and wherein each said side member of said housing has affixed thereto a roller means operable to cooperate with an associated slide means and wherein said cradle has a horizontal extension means;

whereby said slide means and said roller means cooperate to provide a low friction mechanism such that said horizontal extension means is operable to extend said cradle horizontally out of said central region to facilitate the placement of an engine block to be bored, or removal of an engine block, already bored, from said cradle and whereby said horizontal extension means is operable to retract said cradle horizontally into said central region preparatory to boring the block placed thereon.

16. The engine boring fixture according to claim 15, having further an electrical-pneumatic control means operable to enable said means for vertical support to raise said cradle vertically only when said cradle has been fully retracted into said central region and further operable to enable said horizontal extension means to extend said cradle horizontally out of said central region only when said cradle has been fully lowered within said central region.

17. The engine boring fixture according to claim 16, wherein
    said central means includes a first and a second limit switch;
    said first limit switch being operable to sense said fully retracted state of said cradle within said central region;
    said second limit switch being operable to sense said fully lowered state of said cradle within said central region.

18. The engine boring fixture according to claim 15 wherein said horizontal extension means comprises:
    a two way air cylinder with an elongated housing containing a piston operative to move axially within said housing a limited distance;
    said piston having an end operably affixed to said cradle and said housing being affixed to said means for vertical support;
    whereby as said piston moves axially in a first direction, said cradle, attached thereto, is extended horizontally from said central region and as said piston moves axially opposite said first direction, said cradle is retracted within said central region.

19. The engine boring fixture according to claim 13 having further
    a mechanical support means attached to said top member;
    said mechanical support means being operable to mechanically engage said cradle, when said cradle has been moved vertically to position the engine block to be bored, to provide a rigid support for said cradle while the engine block is being bored.

20. The engine boring fixture according to claim 19 wherein said mechanical support means comprises:
    a threaded shaft operable to engage a threaded boring through said top member and extending into said central region,
    said shaft having a tab perpendicularly affixed thereto adjacent a first end, within said central region;
    said cradle having selectively located thereon a slot engageable by said tab;
    whereby said tab engaging said slot in said cradle provides said rigid support for said cradle while the engine is being bored.

21. The engine boring fixture according to claim 13, wherein said means for vertical support comprises:
    an L-shaped support member having a horizontal section and a vertical section;
    a vertical guide member affixed, within said central region, to said housing;
    said horizontal section of said L-shaped support member being located below and adjacent to a lower surface of said elongated floor of said engine support cradle;
    said vertical section of said L-shaped support member being operative to cooperate with said vertical guide member whereby said means for vertical support is operable to lift said L-shaped support member, and said cradle, vertically while said vertical guide member cooperates with said vertical section of said L-shaped member, to minimize moving frictional forces and to stabilize said L-shaped member as it moves vertically.

* * * * *